(12) United States Patent
Kito et al.

(10) Patent No.: US 9,751,397 B2
(45) Date of Patent: Sep. 5, 2017

(54) FUELING FILLER NECK DEVICE FORMED WITH A FIRST RESIN LAYER THAT IS STACKED ON A HARDER SECOND RESIN LAYER

(71) Applicant: TOYODA GOSEI CO., LTD., Kiyosu-shi, Aichen-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 129 days.

(21) Appl. No.: 14/721,115

(22) Filed: May 26, 2015

(65) Prior Publication Data

US 2015/0343898 A1    Dec. 3, 2015

(30) Foreign Application Priority Data

May 29, 2014  (JP) .................. 2014-111204

(51) Int. Cl.
*B60K 15/04* (2006.01)
*B60K 15/03* (2006.01)

(52) U.S. Cl.
CPC .... *B60K 15/04* (2013.01); *B60K 2015/03467* (2013.01); *B60K 2015/047* (2013.01); *B60K 2015/0429* (2013.01); *B60K 2015/0461* (2013.01)

(58) Field of Classification Search
CPC .. B60K 15/04; B60K 15/0461; B60K 15/047; B29C 65/08; B29C 65/1635; B29C 66/543; B29C 66/545

USPC ....... 220/4.14, 62.11, 62.22, 86.1–86.2, 586; 141/311 R, 312, 349–351

See application file for complete search history.

(56) References Cited

U.S. PATENT DOCUMENTS

| 4,482,075 A * | 11/1984 | Stotz .................. B60K 15/0406 220/301 |
| 8,403,001 B2 * | 3/2013 | Ishizaka ................ B60K 15/04 137/515 |
| 8,539,993 B2 * | 9/2013 | Hagano .................. B60K 15/04 141/302 |

(Continued)

FOREIGN PATENT DOCUMENTS

| JP | H09-68126 A | 3/1997 |
| JP | 2005205986 A * | 8/2005 |
| JP | 2006-181880 A | 7/2006 |

*Primary Examiner* — Chun Cheung
*Assistant Examiner* — Brijesh V. Patel
(74) *Attorney, Agent, or Firm* — Posz Law Group, PLC

(57) ABSTRACT

This fueling device comprises a filler neck formed by stacking a first resin layer made of a first resin and a second resin layer made of a second resin that is harder than the first resin, such that the second resin layer is provided on an inner side of the first resin layer; and a mounting member mounted to a fuel injection opening side of the filler neck from outside. The first resin layer has a higher impact resistance than the second resin layer. The second resin layer has a higher fuel permeation resistance than the first resin layer. The filler neck includes an engagement element that is provided on the fuel injection opening side of the filler neck and is extended radially outward from the second resin layer to pass through the first resin layer. The mounting member is engaged with the engagement element to be mounted to the filler neck.

5 Claims, 5 Drawing Sheets

(56) References Cited

U.S. PATENT DOCUMENTS

| 2014/0084005 | A1* | 3/2014 | Kito | B29C 45/1657 |
| | | | | 220/304 |
| 2014/0091095 | A1* | 4/2014 | Hagano | B60K 15/05 |
| | | | | 220/562 |
| 2014/0230962 | A1* | 8/2014 | Kito | B67D 7/42 |
| | | | | 141/311 R |

* cited by examiner

FUELING FILLER NECK DEVICE FORMED WITH A FIRST RESIN LAYER THAT IS STACKED ON A HARDER SECOND RESIN LAYER

CROSS-REFERENCE TO RELATED APPLICATION

The present application claims priority from Japanese application P2014-111204 filed on May 29, 2014, the content of which is hereby incorporated by reference into this application.

TECHNICAL FIELD

The invention relates to a fueling device.

DESCRIPTION OF RELATED ART

In a conventionally known fueling device used for automobile, a resin filler neck is provided as a two-color molded product of an outer layer having high impact resistance and an inner layer having low fuel permeability (high fuel permeation resistance) (JP 2006-181880A). A fuel cap or a capless fuel injection mechanism is mounted to the filler neck, so that a sleeve, a retainer or the like is engaged with and assembled to a filler neck opening.

SUMMARY

The outer layer of the filler neck is made of a resin having impact resistance, such as polyethylene. Such a resin is generally soft to provide the impact resistance. There is accordingly a need to enhance the strength of an engagement structure for engagement with the sleeve, the retainer or the like.

In order to solve at least part of the problems described above, the invention may be implemented by the following aspects.

According to one aspect of the invention, there is provided a fueling device which a fuel nozzle is inserted in. This fueling device may comprise a filler neck formed by stacking a first resin layer made of a first resin and a second resin layer made of a second resin that is harder than the first resin, such that the second resin layer is provided on an inner side of the first resin layer; and a mounting member mounted to a fuel injection opening side of the filler neck from outside. The first resin layer may have a higher impact resistance than the second resin layer. The second resin layer may have a higher fuel permeation resistance than the first resin layer. The filler neck may include an engagement element that is provided on the fuel injection opening side of the filler neck and is extended radially outward from the second resin layer to pass through the first resin layer. The mounting member may be engaged with the engagement element to be mounted to the filler neck.

In the fueling device of this aspect, the first resin slayer has impact resistance, and the second resin layer laid on the inner side of the first resin layer has low fuel permissibility (high fuel permeation resistance). In the fueling device of this aspect, the mounting member is engaged with and mounted to the filler neck by the engagement element of the second resin layer extended radially outward to pass through the first resin layer. This engagement element is made of the second resin harder than the first resin layer. The fueling device of this aspect accordingly ensures the strength of the engagement element used for engagement of the mounting member. This accordingly enhances the reliability of mounting the mounting member to the filler neck.

(2) In the fueling device of this aspect, the filler neck may include the engagement element provided at such a position which the fuel nozzle inserted through a fuel injection opening of the filler neck comes into contact with. During fueling with the fuel nozzle inserted in the fuel injection opening, the fuel nozzle is generally kept inserted in the fuel injection opening, so that a load is applied from the fuel nozzle to the mounting member mounted to the filler neck from the fuel injection opening side at the position of contact with the fuel nozzle. In the fueling device of this aspect, the engagement element is provided at the position which the fuel nozzle comes into contact with. This configuration resists against the load applied from the fuel nozzle and accordingly does not deteriorate the reliability of mounting the mounting member to the filler neck during fueling.

DESCRIPTION OF EMBODIMENTS

Figure 1:
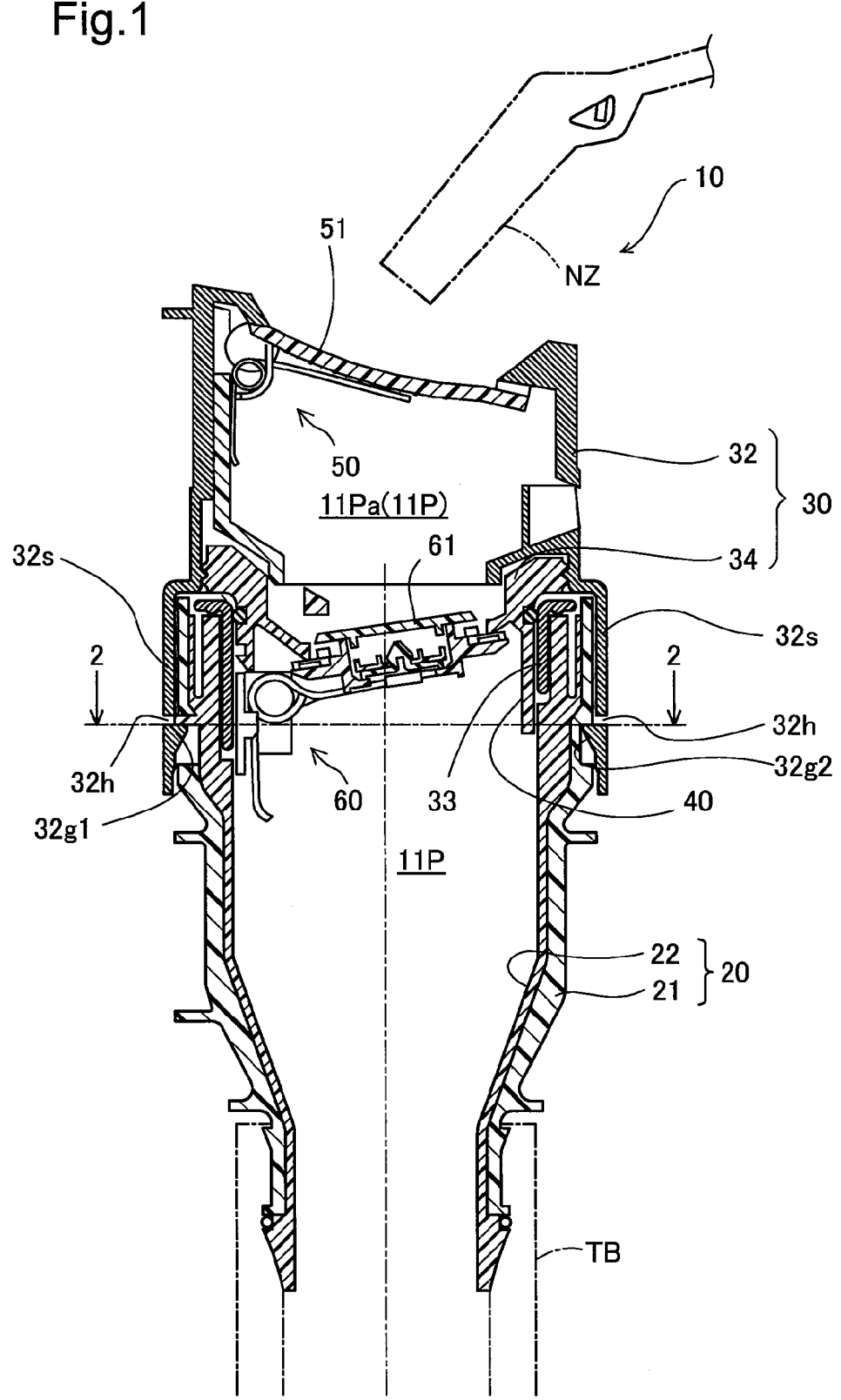
FIG. 1 is a sectional view illustrating a fueling device according to one embodiment of the invention.

The following describes embodiments of the invention with reference to the accompanied drawings. FIG. 1 is a sectional view illustrating a fueling device 10 according to a first embodiment of the invention. The fueling device 10 for a fuel tank according to this embodiment has a capless structure and includes an insertion-side open close mechanism 50 and a filler port open close mechanism 60 mounted to a filler neck 20. The filler neck 20 has a fuel path 11P that is connected to a fuel tank (not shown). The fueling device 10 also includes a cover or mounting member 32 and an upper end flange 34 provided to mount and hold these open close mechanisms 50 and 60. In the process of fueling with the fueling device 10, a fuel nozzle NZ presses open a first open close member 51 of the insertion-side open close mechanism 50 and a second open close member 61 of the filler port open close mechanism 60 to enter the fuel path 11P. During fueling, an inserted end of the fuel nozzle NZ is located in the fuel path 11P. In this state, fuel is injected from the fuel nozzle NZ into the fuel path 11P, and the injected fuel is supplied through the fuel path 11P of the filler neck 20 and a downstream tube TB into a fuel tank (not shown).

The insertion-side open close mechanism 50 is built in the cover or mounting member 32 and is mounted to the filler neck 20 indirectly via the cover member (or mounting member) 32. The filler port open close mechanism 60 is built in the cover member 32 via the upper end flange 34. The filler port open close mechanism 60 is mounted to the filler neck 20 indirectly via the cover member 32 in the state that a flow path inner wall protective plate 40 is protruded in the fuel path 11P. The upper end flange 34 and the cover member 32 form an opening-forming member 30 that is equipped with the insertion-side open close mechanism 50 and the filler port open close mechanism 60. The structures of the insertion-side open close mechanism 50 and the filler port open close mechanism 60 are known in the art and are not directly related to the subject matter of the invention and are thus not described in detail.

Figure 2:
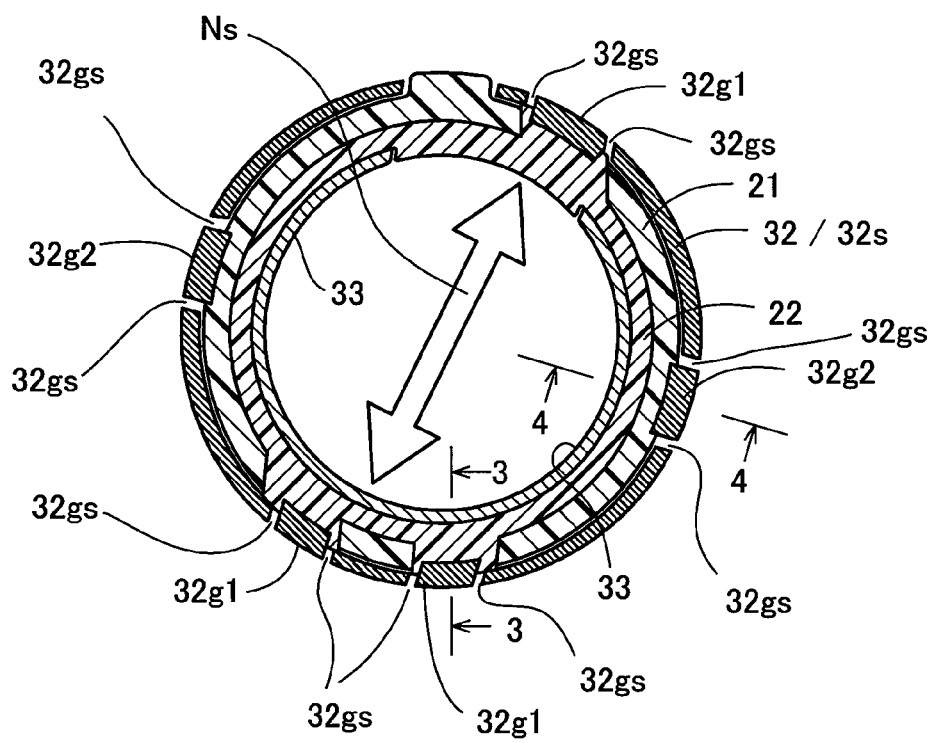
FIG. 2 is a diagram illustrating the relationship of respective members in a section of the fueling device taken on a line 2-2 in FIG. 1.
Figure 3A:
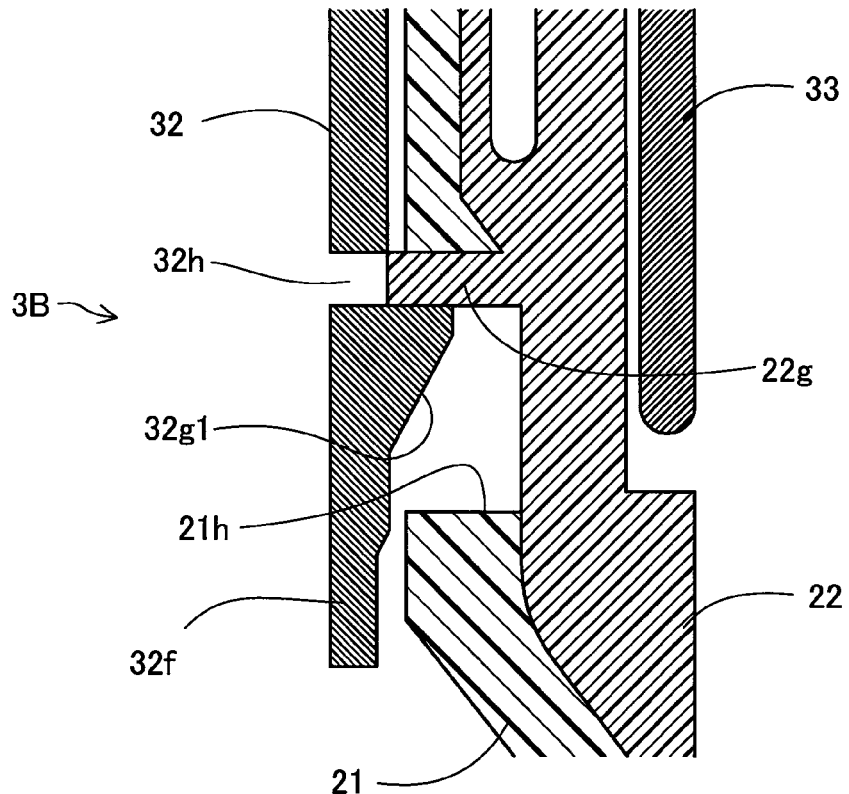
FIG. 3A is a diagram illustrating a main part of the fueling device in a section taken on a line 3-3 in FIG. 2.
Figure 3B:
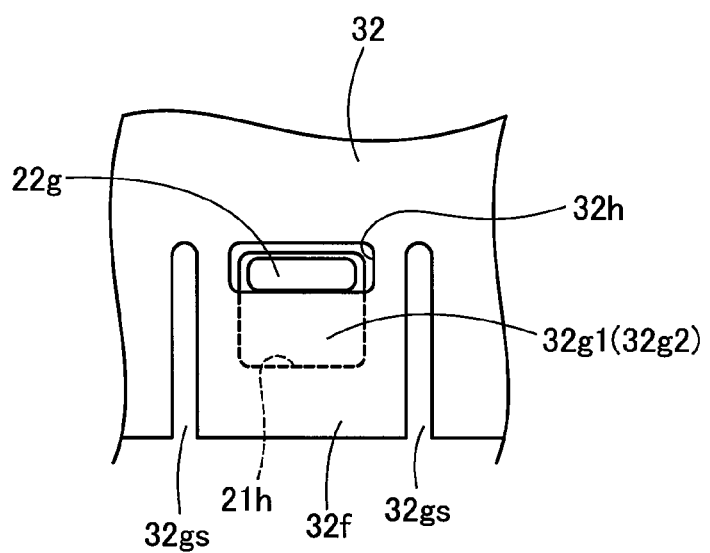
FIG. 3B is a diagram viewed from an arrow 3B in FIG. 3A.
Figure 4:
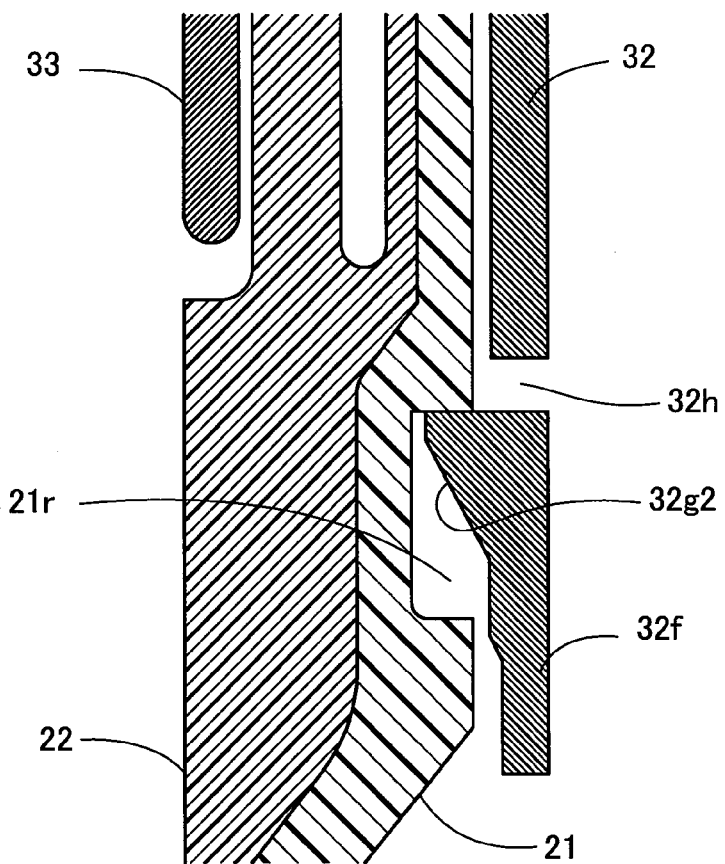
FIG. 4 is a diagram illustrating the main part of the fueling device in a section taken on a line 4-4 in FIG. 2.

FIG. 2 is a diagram illustrating the relationship of respective members in a section of the fueling device 10 taken on a line 2-2 in FIG. 1. FIG. 3A is a diagram illustrating a main part of the fueling device 10 in a section taken on a line 3-3 in FIG. 2. FIG. 4 is a diagram illustrating the main part of the fueling device 10 in a section taken on a line 4-4 in FIG. 2. An engagement arm illustrated on the left side of the illustration of FIG. 1 should be actually a second engagement arm 32g2 (described later) as shown in FIG. 2. In order to facilitate comparison in shape difference between first engagement arms 32g1 and second engagement arms 32g2, however, the first engagement arm 32g1 is shown on the left side of the illustration of FIG. 1 and the second engagement arm 32g2 is shown in the right side of the illustration of FIG. 1. FIG. 3B is a diagram viewed from an arrow 3B in FIG. 3A.

As shown in FIG. 1, the cover member 32 has an engagement sleeve 32s at its lower end. The engagement sleeve 32s has a larger diameter than the diameter of a fuel injection opening-side diameter of the filler neck 20. The filler neck 20 will be described later in detail. A plurality of through holes 32h are formed and provided at some intervals around the outer circumference of the engagement sleeve 32s of the cover member 32. As shown in FIG. 3B, slits 32gs are provided on both the left side and the right side (in the circumferential direction) of each of the through holes 32h to be extended from positions slightly away from the through hole 32h to a lower end of the engagement sleeve 32s. A part defined by the through hole 32h and the two slits 32gs forms the first engagement arm 32g1 or the second engagement arm 32g2. The first engagement arm 32g1 or the second engagement arm 32g2 is formed in a tongue-like shape to be extended in the axial direction of the fuel path 11P and parted by the slits 32gs formed along the axial direction of the fuel path 11P on the respective ends of the through hole 32h (as shown in FIG. 3B). With respect to both the first engagement arm 32g1 and the second engagement arm 32g2, the wall thickness is large at an upper end immediately below the through hole 32h, is gradually decreased toward a lower end and reaches the smallest at a lower end 32f, as shown in FIGS. 3 and 4A. The first engagement arm 32g1 and the second engagement arm 32g2 have identical configurations.

As shown in FIG. 3A, the first engagement arm 32g1, in combination with the cover member 32, is engaged with an engagement projection 22g formed to be protruded from a second resin layer 22 of the filler neck 20. The second engagement arm 32g2 is, on the other hand, engaged with an engagement recess 21r of a first resin layer 21 of the filler neck 20 as shown in FIG. 4. Providing the through holes 32h makes both the first and the second engagement arms 32g1 and 32g2 more likely to be deformed in the course of engagement. According to this embodiment, the through hole 32h serves as the deformable portion. The cover member 32 of this configuration is mounted to a fuel injection opening side of the filler neck 20 from outside and is engaged with the filler neck 20 by means of both the first and the second engagement arms 32g1 and 32g2 as described later, so as to form an insertion passage 11Pa located on an upper end of the fuel path 11P. The positions at which the first engagement arms 32g1 and the second engagement arms 32g2 are formed and the engagement of the first and the second engagement arms 32g1 and 32g2 with the filler neck 200 will be described below, along with the structure of the filler neck 20.

The filler neck 20 is a two-color molded product formed by stacking two different resin materials or more specifically a first resin layer 21 and a second resin layer 22 and is connected with the tube TB on its lower end. The filler neck 20 has a breather pipe (not shown) in the upstream of a joint with the tube TB. The breather pipe is a tubular body branched off from the side wall of the filler neck 20 and is connected with the fuel tank as a separate flow path from the fuel path 11P. This configuration causes the fuel vapor in the fuel tank to be returned to the filler neck 20 during fueling and thereby ensures smooth fueling.

The first resin layer 21 is made of a resin material having high impact resistance, for example, polyethylene (PE) and mainly contributes to enhance the impact resistance of the filler neck 20. The first resin layer 21 has the higher impact resistance than at least the second resin layer 22. The second resin layer 22 is made of a resin material having low fuel permeability (high fuel permeation resistance) and higher hardness than the resin material of the first resin layer 21, for example, polyamide (PA) such as nylon or an ethylene-vinyl alcohol copolymer (EVOH) and mainly serves as a barrier layer to suppress permeation of the fuel. The second resin layer 22 has the higher fuel permeation resistance than at least the first resin layer 21.

As shown in FIG. 3A, the first resin layer 21 has resin layer through holes 21h of a rectangular shape in front view on the fuel injection opening side of the fuel path 11P. The second resin layer 22 stacked on the inner side of the first resin layer 21 has the engagement projections 22g that are protruded radially outward at positions corresponding to the respective upper sides of the resin layer through holes 21h. The engagement projection 22g corresponds to the narrower concept of the engagement element described in Summary. The engagement projections 22g are molded integrally with the second resin layer 22 to be extended from the outer circumferential wall surface of the second resin layer 22. The engagement projection 22g has such a height that passes through the resin layer through hole 21h of the first resin layer 21 and is further protruded slightly outward in the radial direction. The filler neck 20 is provided with the engagement projections 22g and the resin layer through holes 21h which the corresponding engagement projections 22g pass through, at a plurality of positions on the respect ends of a two-headed open arrow Ns shown in FIG. 2. The engagement projections 22g and the resin layer through holes 21h are provided at three different positions or more specifically at one position on the upper side shown by the two-headed arrow Ns and at two positions on the lower side shown by the two-headed arrow Ns in FIG. 2. The directions indicated by the two-headed arrow Ns denote the directions in which the dead weight of the fuel nozzle NZ and a nozzle operation-induced load are applied when the fuel nozzle NZ is inserted into the fueling device 10 for fueling. In the description hereof, these directions are referred to as directions of load application by fuel nozzle. The first resin layer 21 has engagement recesses 21r that are concaved in a rectangular shape in front view on the fuel injection opening side of the fuel path 11P as shown in FIG. 4. The engagement recesses 21r are provided at two different positions on the respective ends in a direction approximately perpendicular to the two-headed open arrow Ns.

As shown in FIG. 2, the cover member 32 has the first engagement arms 32g1 and the second engagement arms 32g2 formed around the circumference of the fuel path 11P. The first engagement arms 32g1 are provided at the positions corresponding to the three engagement projections 22g formed in the filler neck 20, and the second engagement arms 32g2 are provided at the positions corresponding to the two engagement recesses 21r formed in the filler neck 20. The filler neck 20 also has an opening sleeve 33 on the fuel injection opening side, and the filler port open close mechanism 60 is placed on the inner circumferential side of this opening sleeve 33. In the fueling device 10 of the embodiment, for the purpose of static protection of the filler neck 20, the second resin layer 22 is made electrically conductive and has the engagement projections 22g that are extended radially outward to pass through the first resin layer 21 and are grounded to the vehicle body by ground leads. Conductive particles such as carbon particles are mixed with the above resin to provide the second resin layer 22 with the electrical conductivity.

The following describes a procedure of manufacturing the fueling device 10. The opening-forming member 30 including the cover member 32 is produced first by injection molding. The filler neck 20 is produced by, for example, two-color injection molding, blow molding or tube extrusion molding using the two different resin materials described above. When injection molding is employed for production of the filler neck 20, the procedure injects modified polyethylene as the first resin material to form the first resin layer 21 and subsequently injects polyamide to form the second resin layer 22. The modified polyethylene is a resin material prepared by adding a polar functional group, for example, a functional group modified with maleic acid to polyethylene (PE) and is bonded to polyamide (PA) by reactive adhesion with heat during injection molding. The first resin layer 21 and the second resin layer 22 are accordingly welded to and integrated with each other by reactive adhesion in two-color molding. When blow molding is employed, a parison that is a layered material of two different resins is used for production of the filler neck 20. When tube extrusion is employed, two different resin materials are coaxially stacked and extruded for production of the filler neck 20. The cover member 32 and the upper end flange 34 of the opening-forming member 30 are respectively formed by injection molding of polyethylene.

The procedure subsequently assembles the filler port open close mechanism 60 to the upper end flange 34 of the opening-forming member 30 and assembles the insertion-side open close mechanism 50 to the cover member 32, and presses the cover member 32 against the filler neck 20 from its fuel injection opening side. The cover member 32 is pressed after the first engagement arms 32g1 and the second engagement arms 32g2 of the cover member 32 are positioned around the periphery of the fuel path 11P to be respectively aligned with the engagement projections 22g of the second resin layer 22 of the filler neck 20 and with the engagement recesses 21r of the first resin layer 21 of the filler neck 20. As the cover member 32 is pressed, the first engagement arms 32g1 and the second engagement arms 32g2 on the lower end of the engagement sleeve 32s are bent along the outer wall of the first resin layer 21 at the fuel injection opening of the filler neck 20. In the pressed state, the three first engagement arms 32g1 are engaged with the corresponding engagement projections 22g extended radially outward to pass through the first resin layer 21 (as shown in FIG. 3A), and the two second engagement arms 32g2 are engaged with the corresponding engagement recesses 21r of the first resin layer 21 (as shown in FIG. 4). The cover member 32 assembled with the insertion-side open close mechanism 50 and the filler port open close mechanism 60 are mounted to the fuel injection opening side of the filler neck 20 from outside. This completes the fueling device 10 shown in FIG. 1.

The fueling device 10 of the first embodiment of the above configuration has the filler neck 20 including the first resin layer 21 that has the impact resistance and the second resin layer 22 that is laid on the inner side of the first resin layer 21 and has the fuel permeation resistance (fuel barrier property). In the fueling device 10 of the embodiment, the cover member 32 is engaged with and mounted to the filler neck 20 by engagement of the engagement projections 22g of the second resin layer 22 extended radially outward to pass through the first resin layer 21 with the first engagement arms 32g1 of the cover member 32. The engagement projections 22g to be engaged with the first engagement arms 32g1 are made of the resin that is harder than the resin used for formation of the first resin layer 21 and accordingly have the enhanced strength. In the fueling device 10 of this aspect, this configuration ensures the strength of the engagement projections 22g used for engagement of the cover member 32 and enhances the reliability of mounting the cover member 32 to the filler neck 20.

In the fueling device 10 of this embodiment, the cover member 32 is additionally fixed by engagement of the engagement recesses 21 provided in the first resin layer 21 with the second engagement arms 32g2. This configuration enables the cover member 32 to be securely mounted to the first resin layer 21 that is the outer layer of the filler neck 20, while improving the appearance.

In the fueling device 10 of the embodiment, the engagement projections 22g extended radially outward to pass through the first resin layer 21 are provided in the filler neck 20 at the positions which the fuel nozzle NZ inserted in the fuel injection opening comes into contact during fueling (on both ends in the directions of load application by fuel nozzle shown by the open two-faced arrow Ns in FIG. 2). During fueling with the fuel nozzle NZ inserted in the fuel injection opening, the fuel nozzle NZ is generally kept inserted in the fuel injection opening. The dead weight of the fuel nozzle NZ and the nozzle operation-induced load are accordingly applied at the position of contact with the fuel nozzle NZ and its periphery to the cover member 32 mounted to the filler neck 20 from the fuel injection opening side. In the fueling device 10 of the embodiment, the engagement projections 22g are provided at the positions which the fuel nozzle NZ comes into contact with to apply the load as shown in FIG. 2 to be engaged with the first engagement arms 32g1 of the cover member 32. This configuration resists against the load applied from the fuel nozzle NZ and does not damage the reliability of mounting the cover member 32 to the filler neck 20 during fueling.

In the fueling device 10 of the embodiment, the cover member 32 assembled with the insertion-side open close mechanism 50 and the filler port open close mechanism 60 is removed from the filler neck 20 by disengagement of the first engagement arms 32g1 and the second engagement arms 32g2. This enables the filler port open close mechanism 60 to be readily detached from the filler neck 20 for replacement when the filler port open close mechanism 60 has some failure or damage.

Figure 5:
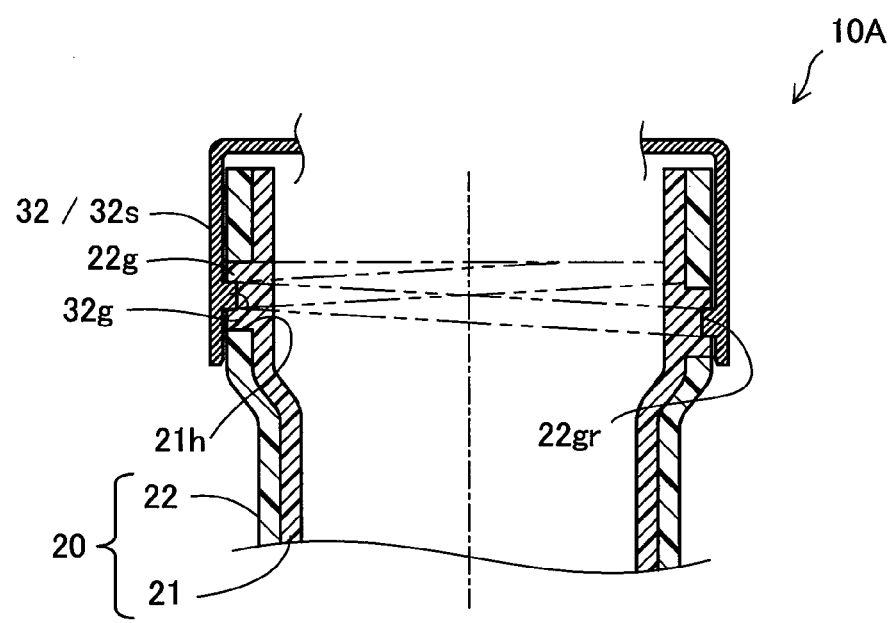
FIG. 5 is a sectional view illustrating a main part of a fueling device according to a second embodiment.

The following describes another embodiment. FIG. 5 is a sectional view illustrating a main part of a fueling device 10A according to a second embodiment. As illustrated, this fueling device 10A has a filler neck 20 with a plurality of engagement projections 22g of a second resin layer 22 that are extended radially outward to pass through resin layer through holes 21h of a first resin layer 21. A groove is formed on the outer circumferential wall surface of the engagement projection 22g. The grooves formed in the plurality of engagement projections 22g are combined to form a male threaded portion 22gr as a whole. In other words, the plurality of grooves are formed to have threads around the outer circumferential wall of the engagement projections 22g and serve as the male threaded portion 22gr as a whole. The cover member 32, on the other hand, has a female threaded portion 32g on the inner wall surface at a lower end of an engagement sleeve 32s. The female threaded portion 32g is formed around the inner circumferential wall of the engagement sleeve 32s to be mated with the threads of the male threaded portion 22gr. The female threaded portion 32g is formed continuously in this embodiment but may be formed discretely or more specifically only in ranges that are screwed to the male threaded portion 22gr.

The cover member 32 is provided as the cover member that has the capless structure and is assembled with the insertion-side open close mechanism 50 and the filler port open close mechanism 60 in the above embodiment, but may be a cover member which a fuel cap is mounted to. In the fueling device 10A of this embodiment, the cover member 32 is engaged with and mounted to the fuel injection opening side of the filler neck 20 by screwing the female threaded portion 32g of the cover member 32 to the male threaded portion 22gr of the engagement projections 22g of the second resin layer 22 extended radially outward to pass through the first resin layer 21. In the fueling device 10A of this embodiment, the engagement projections 22g forming the male threaded portion 22gr that is to be screwed to and engaged with the female threaded portion 32g is made of the resin harder than the resin used for formation of the first resin layer 21 to have the enhanced strength. In the fueling device 10A of this embodiment, this configuration ensures the strength of the engagement projections 22g used for engagement of the cover member 32 and enhances the reliability of mounting the cover member 32 to the filler neck 20.

The following describes a third embodiment. According to the third embodiment, the amount of outward protrusion of the engagement projection 22g is set to be smaller than the thickness of the first resin layer 21. As a result, a leading end of the engagement projection 22g does not pass through the resin layer through hole 21h but is located inside of the resin layer through hole 21h. This embodiment has the similar advantageous effects to those of the first embodiment. In this configuration, the resin layer through hole 21h may not be provided as a through hole but may be provided as a bottomed hole (concave or recess) having such a depth that allows the engagement projection 22g to be engaged with. In this structure that the engagement projection 22g does not pass through the first resin layer 21, the first engagement arm 32g1 and the second engagement arm 32g2 may be configured to be engaged with the engagement projection 22g, like the configuration of FIG. 3. Another configuration may, however, be employed instead. For example, a part or a whole of the resin layer through hole 21h may not be provided as a through hole but may be provided as a bottomed hole (concave or recess) formed on the outer surface of the first resin layer 21 to have such a depth that allows the first and the second engagement arms 32g1 and 32g2 to be engaged with. In this modified configuration, the first and the second engagement arms 32g1 and 32g2 are not directly engaged with the engagement projection 22g but are engaged with the engagement projection 22g via a hole formed in the first resin layer 21 in the vicinity of the engagement projection 22g.

The invention is not limited to the embodiments described above but may be implemented by a diversity of other configurations without departing from the scope of the invention. For example, the technical features of the embodiments corresponding to the technical features of the respective aspects described in Summary may be replaced or combined appropriately, in order to solve part or all of the problems described above or in order to achieve part or all of the advantageous effects described above. Any of the technical features may be omitted appropriately unless the technical feature is described as essential herein.

In the fueling device 10 described above, the second engagement arms 32g2 of the cover member 32 are engaged with the engagement recesses 21r of the first resin layer 21. This configuration of engagement may be replaced by engagement between the engagement projections 22g and the first engagement arms 32g1. The number of engagement positions is not limited to the number in the above embodiment but may be two to four positions or may be six or more positions. The shape of the resin layer through hole 21h is not limited to the rectangular shape in front view but may be any shape that allows the engagement projection 22g to pass through and is engageable with the first engagement arm 32g1. Similarly the shape of the engagement recess 21r is not limited to the rectangular shape in front view but may be any shape that is engageable with the second engagement arm 32g2.

The through holes 32h provided to facilitate bending of the first engagement arms 32g1 or the second engagement arms 32g2 may be formed in any suitable shape, such as a circle or a rectangle. Additionally, the configuration of the through hole is not essential, in order to facilitate bending of the first engagement arm 32g1 or the second engagement arm 32g2. For example, the periphery of the first engagement arm 32g1 or the second engagement arm 32g2 may be made to have a reduced wall thickness. In another example, the periphery of the first engagement arm 32g1 or the second engagement arm 32g2 may be cut in a slit-like shape.

What is claimed is:

1. A fueling device in which a fuel nozzle is inserted, the fueling device comprising:
   a filler neck extending axially and having an opening side configured to receive fuel injection from the fuel nozzle, the filler neck including a layered structure formed by stacking a first resin layer made of a first resin on a second resin layer made of a second resin, the second resin is harder than the first resin, and the second resin layer is provided on an inner side of the first resin layer; and
   a mounting member mounted on the opening side of the filler neck, wherein
   the first resin layer has a higher impact resistance than the second resin layer,
   the second resin layer has a higher fuel permeation resistance than the first resin layer,
   the filler neck includes an engagement element provided on the opening side of the filler neck, the engagement element being made of the second resin and being part of the second resin layer and extending radially outward from the second resin layer and passing through and beyond the first resin layer, and
   the mounting member having an engagement sleeve that is mounted on the opening side of the filler neck, and the engagement sleeve is configured to engage with the engagement element of the filler neck and secure the mounting member on the filler neck, wherein the engagement sleeve of the mounting member includes an engagement arm that engages with at least one of the engagement element and an engagement recess of the first resin layer of the filler neck.

2. The fueling device according to claim 1, wherein the engagement arm is bordered by and extends between two axially extending slits provided in the engagement sleeve of the mounting member, the two slits defining a deformable portion provided at a position of the engagement sleeve corresponding to the engagement element of the filler neck, and the deformable portion of the engagement arm is configured to enable deforming of the deformable portion in a radial direction.

3. The fueling device according to claim 1, wherein the filler neck has a plurality of the engagement elements that are provided around an outer circumference of the filler neck and respectively include grooves formed in a circumferential direction around outer circumferences of the plurality of engagement elements, and projections protruded radially inward are provided on an inner circumference of the mounting member at a plurality of positions corresponding to the engagement elements and are fit in the grooves of the engagement elements by rotation of the mounting member.

4. The fueling device according to claim 2, wherein the mounting member has a through hole that engages the engaging element of the filler neck.

5. A fueling device in which a fuel nozzle is inserted, the fueling device comprising:

a filler neck extending axially and having an open end configured to receive fuel injection through the fuel nozzle, the filler neck including a layered structure formed by stacking a first resin layer made of a first resin on a second resin layer made of a second resin, the second resin being harder than the first resin, and the second resin layer being provided on an inner side of the first resin layer; and a mounting member mounted on the opening side of the filler neck, wherein the first resin layer has a higher impact resistance than the second resin layer, the second resin layer has a higher fuel permeation resistance than the first resin layer, the filler neck including an engagement element and an engagement recess provided around an outer circumference of the open end of the filler neck, the engagement recess being formed in the first resin layer; and the engagement element being part of the second resin, extending radially outward from the second resin layer and passing through and beyond the first resin layer, and the mounting member having an engagement sleeve mounted on the opening side of the filler neck including a plurality of engagement arms configured to secure the mounting member on the filler neck, one of the plurality of engagement arms engaging with the engagement element of the filler neck, and another one of the plurality of engagement arms engaging with the engagement recess of the filler neck, wherein the engagement sleeve of the mounting member includes slits adjacent the plurality of engagement arms, and the one of the plurality of engagement arms engaging with the engagement element of the filler neck includes a through hole receiving the engagement element of the filler neck.

* * * * *